Figures 9, 10, 11:
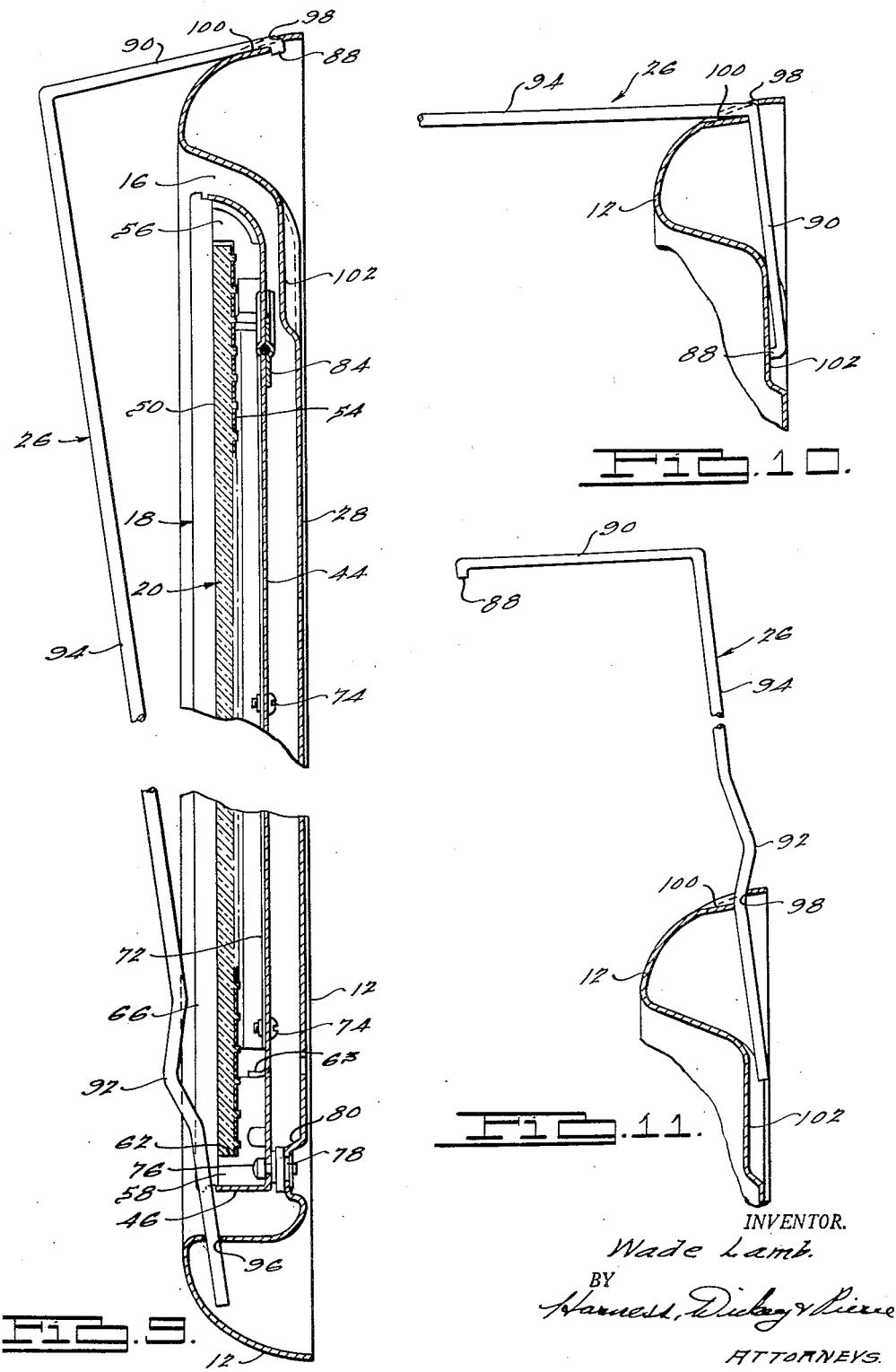

Jan. 2, 1951 W. LAMB 2,536,648
RADIANT HEATER
Filed March 26, 1948 3 Sheets-Sheet 1
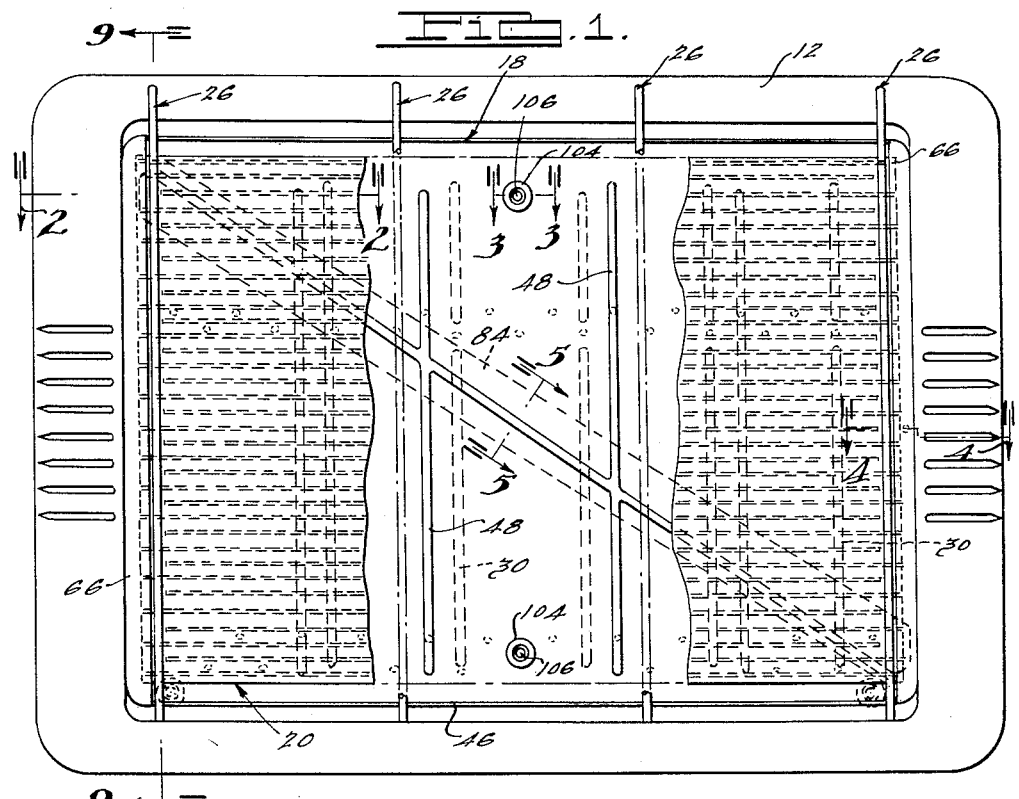
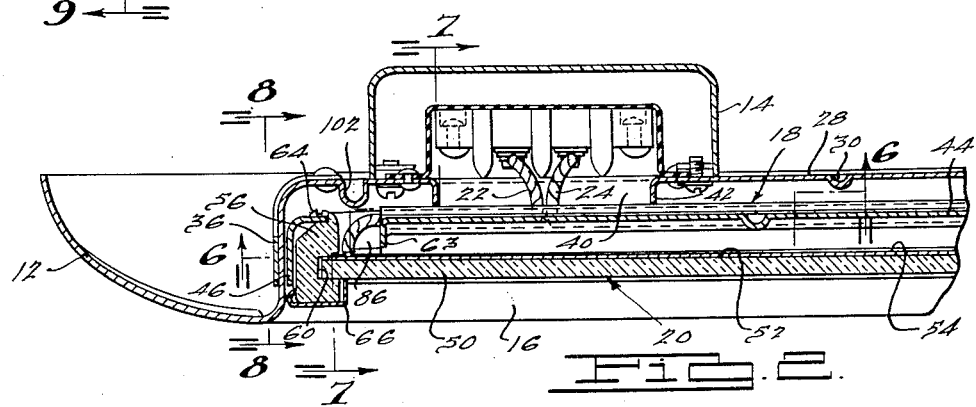
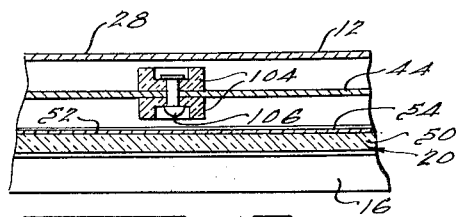
INVENTOR.
Wade Lamb.
BY
Harness, Dickey & Pierce
ATTORNEYS

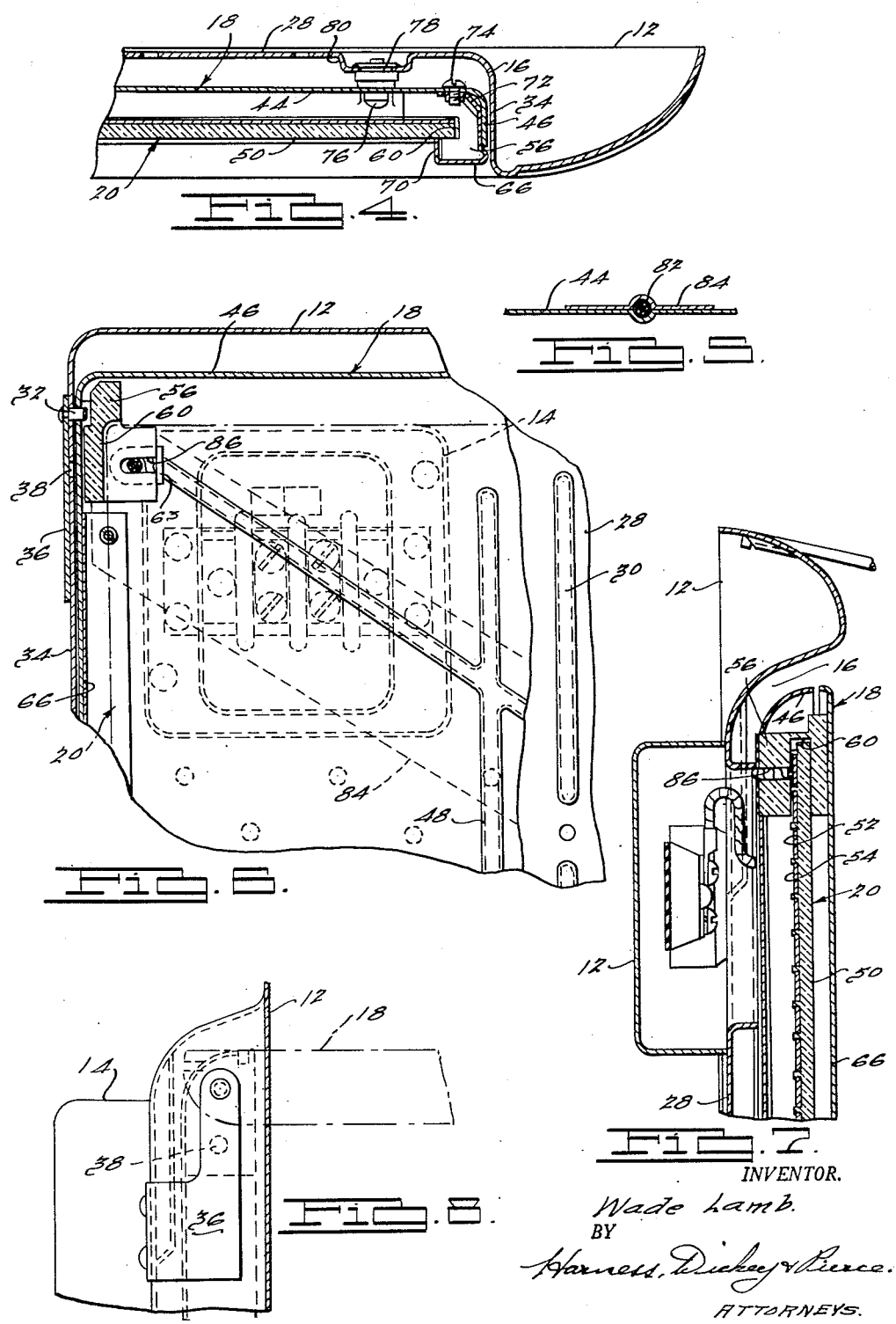

Jan. 2, 1951  W. LAMB  2,536,648
RADIANT HEATER

Filed March 26, 1948  3 Sheets-Sheet 3

INVENTOR.
Wade Lamb.
BY
Harness, Dickey & Pierce
ATTORNEYS.

Patented Jan. 2, 1951

2,536,648

UNITED STATES PATENT OFFICE 2,536,648

RADIANT HEATER

Wade Lamb, Detroit, Mich., assignor, by mesne assignments, to Continental Radiant Glass Heating Corporation, New York, N. Y., a corporation of Michigan Application March 26, 1948, Serial No. 17,229

3 Claims. (Cl. 219—34)

The present invention relates to space heaters, and more particularly to an improved electric wall-type heater.

It is an object of the invention to provide an improved wall-type heater incorporating improved means for removably mounting the heating element on the main frame thereof.

It is also an object of the invention to provide, in a wall-type heater, an improved mounting means for supporting a heater unit assembly comprising a tempered glass element which carries an elongated electrical resistance heating element.

Another object of the invention is to provide a heater having a heating unit assembly of the above-mentioned type, and including improved means for preventing inadvertent disconnecting of the electric wires from the terminals of the heating element.

A further object is to provide a heater having improved means for mounting a heating unit assembly of the above mentioned type which facilitates convection heating by said heater.

It is also an object of the invention to provide a wall-type heater having a protective grill formed of a plurality of L-shaped rods and the main heater frame of which is adapted to support the rods in a first position in which they afford a protective grill for the heater, in a second position in which they form a rack for drying short articles before the heater and in a third position in which they form a rack adapted for drying long articles before the heater.

Other and more detailed objects of the invention will become apparent from a consideration of the following specification, the appended claims, and the accompanying drawings wherein:

Figure 1 is a front elevation of a heater embodying the invention;

Figs. 2, 3, 4, and 5 are enlarged broken sectional views of the structure illustrated in Fig. 1 taken respectively along the lines 2—2, 3—3, 4—4, and 5—5 thereof;

Figs. 6, 7, and 8 are broken sectional views of the structure illustrated in Fig. 2 taken respectively along the lines 6—6, 7—7, and 8—8 thereof;

Fig. 9 is an enlarged broken sectional view of the structure illustrated in Fig. 1 taken substantially along the line 9—9 thereof; and Figs. 10 and 11 are broken sectional views illustrating alternative positions in which the grill rods may be supported.

Referring to the drawings, the heater generally comprises a main frame 12 having an electric terminal box 14 suitably secured to the back thereof and a large shallow recess 16 in its front face, a secondary frame 18 received within the recess 16 and removably mounted on the frame 12, a heating unit assembly 20 mounted on the secondary frame 18 and the terminals of which are suitably connected to the terminal box 14 by electric wires 22 and 24, and a plurality of L-shaped rods 26 normally affording a protective grill at the front of the heater.

The main frame 12 may be secured in place upon an associated wall by any suitable means (not shown) and is preferably stamped or otherwise suitably formed of sheet metal. The central portion thereof is rearwardly offset to provide a vertically extending wall 28 at the inner or rear end of the recess 16 and to the back of which the terminal box 14 is suitably secured. The wall 28 is ribbed or fluted as at 30 to improve its structural strength and prevent warping during operation of the heater. Opposed aligned pivot pins 32 project into the recess 16 through the side walls 34 thereof adjacent their upper ends. The pivot pins 32 are carried on spring arms 36 which are riveted to the frame 12 and urge the pivot pins 32 to the position illustrated in the drawings in which they project into the recess 16. Small apertures 38 are provided in the recess walls 34 below the pivot pin 32 through which any small instrument, such as a pencil or the like, may be inserted to press against the spring finger 36 and withdraw the pivot pin 32 carried thereby from the recess 16. The frame 12 is also provided, at the portion of the wall 28 to which the terminal box 14 is secured, with an aperture 40 opening into the recess 16, a flange 42 surrounding the aperture 40 and projecting into the recess 16.

The secondary frame 18 includes a vertically extending sheet metal wall element 44 the peripheral portion of which defines a forwardly projecting flange 46. The sheet metal member 44 is received within the recess 16 and at opposite ends of the member 44 and adjacent the top thereof, the forwardly turned flange 46 is provided with apertures receiving the pivot pins 32 and pivotally mounting the secondary frame within the recess 16. As in the case of the rear wall portions 28 of the frame 12, the member 44 is ribbed or fluted as at 48 to provide additional structural strength and prevent warping of the member 44 during operation of the heater.

The heater unit assembly 20 is generally of conventional construction and comprises a rectangular glass plate 50 having a long continuous channel 52 etched in one face thereof and running from one corner back and forth across the plate and terminating at the diagonally opposite corner. An electric resisting element is formed by depositing a strip of conventional aluminum alloy 54 in the channel 52. The strip 54 may be applied to the glass 50 in any conventional manner such as spraying the metal 54 onto the tempered glass 50 while the latter is only partially cooled. After cooling, the surface of the glass 50 in which the channel 52 is formed may then be ground to remove the metal from between adjacent portions of the channel 52, thereby insuring a single continuous elongated heating element.

The heating unit assembly 20 is supported on the secondary frame member 44 by means of two pairs of insulators 56 and 58 having recesses 60 and 62 which are complementary to and receive the four corners of the plate 50. These insulators are positioned against forwardly projecting tabs 63 struck from the frame member 44 and are secured to the latter by means of screws 64.

To provide a cover for the insulators 56 and 58 a pair of trim strips 66 extend vertically along opposite ends of the glass plate 50 and at their opposite ends extend over and conceal the insulators 56 and 58. An inner flange 70 of each trim strip 66 extends downwardly and abuts against the outer face of the glass member 50 and the outer flange 72 of each trim strip 66, which extends only intermediate the insulators 56 and 58, extends along the inner face of the secondary frame member 44 and is anchored thereto by means of screws 74.

As best illustrated in Figures 1 and 9, the recess 16 and the secondary frame member 44 are so proportioned that space is provided both at the top and bottom of the secondary frame member 44 between the flange 46 thereof and the upper and lower wall of the recess 16. It will thus be appreciated that during operation of the heater convection air currents may enter at the bottom of the secondary frame 18 and pass upwardly between the secondary frame member 44 and the rear wall 28 of the recess, and pass outwardly at the top of the secondary frame 18. Similarly, the glass plate 50 is so proportioned relative to the secondary frame member 44 that convection air currents may enter at the bottom of the glass plate 50 between the lower edge of the plate and the forwardly turned flange 46 of the secondary frame member 44 and pass upwardly between the heating unit assembly 20 and the secondary frame member 44 and outwardly at the top of the glass plate 50 between its upper edge and the forwardly turned flange 46 of the secondary frame member 44.

The space at the bottom of the glass 50 between the lower edge of the glass 50 and the forwardly turned flange 46 of the secondary frame member 44 also permits access to a pair of screws 76 extending through apertures in the frame member 44 and threading into stationary nut means 78 secured in forwardly offset bosses 80 formed on the frame 12 in the rear wall 28 of the recess 16. The screws 76 secure the secondary frame 18 against pivotal movement relative to the main frame 12, and hold the secondary frame member 44 in spaced parallel relation to the rear wall 28 of the recess 16. To insure that the proper spaced relation is maintained between the walls 28 and 44 and the glass 50, pairs of spacer buttons 104 are secured on opposite sides of the wall member 44 by rivets 106.

The electric wires 22 and 24 have one end connected to associated terminals in the terminal box 14, and enter the recess 16 through the opening 40 in its rear wall 28. The wires 22 and 24 extend to the insulators 56 at the diagonally opposite corners of the heating unit assembly 20 at which are the opposite ends of the electric resistance heating strip 54. The wires extend along and are enclosed in a passage 82 best illustrated in Fig. 5 and defined by complementary recesses formed in the back of the secondary frame member 44 and in a reinforcing strip 84 extending diagonally across the back of the secondary frame member 44 and spot welded or otherwise suitably secured thereto. At the opposite ends of the electric resistance heating element 54 the wire portion of the insulated electric wires 22 and 24, which preferably include a plurality of fine wires, are flared outwardly and soldered or otherwise secured to the heating element 54. The insulators 56 are formed to provide bifurcated portions 86 overlying this connection and firmly gripping an insulated portion of the electric wires 22 and 24. It will be appreciated that this construction prevents inadvertent breaking of the connection between the wires 22 and 24 and the heating element 54 by pulls upon the wires which may result from movement of the secondary frame 18 relative to the main frame 12.

Referring to Figs. 1 and 9, the L-shaped rods 26 have a short hook portion 88 formed on the outer end of the shorter leg 90 thereof and also are provided with an offset portion 92 disposed in spaced relation to the outer end of the longer leg 94 thereof. The frame 12 is provided with a plurality of upwardly presenting apertures 96 formed in the lower wall of the recess 16 and adapted to receive the outer end of the longer leg 94 of the rod 26. Along its upper surface, the frame 12 has a plurality of upwardly presenting apertures 98 adapted to receive either end of the rod 26. Adjacent the apertures 98 the frame 12 is formed to provide forwardly extending channel portions 100 adapted to receive the rods 26 to prevent pivoting of the rods in the apertures 96 and 98. Below the apertures 98 and in substantial alignment therewith, the rear wall 28 of the recess 16 is formed to provide vertically extending upwardly opening channel portions 102 adapted to receive the outer end of either of the legs 90 or 94 of the rods 26.

It will now be appreciated that the rods 26 may be supported on the main frame 12 in a first position illustrated in Figure 9 in which the hooked portion 88 of the shorter leg 90 is received in the aperture 98 and the adjacent portion of the shorter leg is received in the channel portion 100, and the outer end of the longer leg 94 is received in the aperture 96. When the rods 26 are in this position they afford a protective grill for the heater. It will be appreciated that the rods 26 may also be supported on the frame 12 in the position illustrated in Fig. 10 in which the entire shorter leg 90 is received through the aperture 98 and the outer end thereof is received in the channel portion 102, the inner end of the longer leg 90 being received in the channel portion 102 and the remainder of the leg 94 extending outwardly from the heater substantially horizontally and affording a rack adapted to support short articles before the heater. It will also be appreciated that the rods 26 may be supported upon the heater frame 12 in the position illustrated in Figure 11 in which the outer end of the longer leg 94 of the rod projects through the aperture 98 and into the channel portion 102, the rod moving inwardly of the aperture 98 until further movement is prevented by the offset portion 92. In this position of the rods 26 the shorter legs 90 project in a generally horizontal position and afford short racks adapted to support longer articles for drying before the heater such, for example, as hose and the like.

Although only one embodiment of the invention has been illustrated and described in detail, it will be readily appreciated by those skilled in the art that numerous modifications and changes may be made therein without departing from the spirit of the invention or from the scope of the appended claims.

What is claimed is:

1. An electric wall heater comprising a vertically disposed main frame having a horizontally opening recess, a secondary frame disposed within said recess, means for hinging said secondary frame on said main frame in spaced parallel relation to the rear wall of said recess, a tempered glass element having an elongated electrical resistance heating element mounted on the rear face thereof, means mounting said glass element on said secondary frame in spaced parallel relation, and conductor means for electrically connecting said heating element to a suitable supply of electrical energy, said secondary frame having a wall disposed intermediate said glass element and said rear wall of said recess and the construction and arrangement of said main frame, said secondary frame and said glass element being such as to permit convection air currents to flow both between said glass element and said wall of secondary frame and between said wall of said secondary frame and said rear wall.

2. An electric heater comprising a main frame, an electric terminal box mounted on said frame, a secondary frame, means mounting said secondary frame on said main frame and adapted to permit movement of the former relative to the latter, a supporting element, a resistance heating element mounted on said supporting element, means mounting said supporting element on said secondary frame including an insulator adapted to engage said supporting member and having a bifurcated portion overlying said heating element, and conductor means for electrically connecting said heating element to said terminal box, said last named means including a wire having one end connected to said heating element and a portion adjacent said end received in said bifurcated portion of said insulator, said insulator and said wire being so proportioned that said wire is firmly gripped in said bifurcated portion thereby preventing disconnecting of said wire from said heating element by inadvertent pulling of said wire such as may occur during movement of said secondary frame relative to said main frame.

3. An electric heater comprising a sheet metal main frame having a large shallow recess in the front face thereof, a secondary frame disposed within said recess and including a sheet metal wall extending in spaced parallel relation to the rear wall of said recess, a tempered glass supporting element mounted on said secondary frame forwardly of said wall thereof and in spaced parallel relation thereto, an elongated resistance heating element mounted on the inner face of said supporting element and terminating at diagonally opposite corners thereof a reinforcing strip mounted on said wall of said secondary frame and cooperating therewith to define a passage extending between points adjacent said opposite corners, and conductor means for electrically connecting said heating element to a suitable supply of electrical energy, said last named means including insulated wires extending along said passage.

WADE LAMB.

REFERENCES CITED

The following references are of record in the file of this patent:

UNITED STATES PATENTS

| Number | Name | Date |
|---|---|---|
| 1,237,967 | Soans | Aug. 21, 1917 |
| 1,657,808 | Steffen | Jan. 31, 1928 |
| 1,664,171 | Hicks | Mar. 27, 1928 |
| 1,807,363 | Wheatcroft | May 26, 1931 |
| 1,957,558 | Siers | May 8, 1934 |
| 2,119,680 | B. Long | June 7, 1938 |
| 2,455,967 | Adams | Dec. 14, 1948 |